United States Patent [19]

Kuhlmann et al.

[11] E Re. 28,767

[45] Reissued Apr. 13, 1976

[54] DRAWING TABLE

[75] Inventors: Franz Kuhlmann; Arnold Gundlach; Horst Seiffert, all of Wilhelmshaven, Germany

[73] Assignee: Franz Kuhlmann KG, Wilhelmshaven, Germany

[22] Filed: June 19, 1975

[21] Appl. No.: 588,185

Related U.S. Patent Documents

Reissue of:

[64] Patent No.: 3,826,204
Issued: July 30, 1974
Appl. No.: 296,586
Filed: Oct. 11, 1972

[30] Foreign Application Priority Data

Oct. 11, 1971 Germany ..... 2150633

[52] U.S. Cl. ..... 108/2; 108/4
[51] Int. Cl.[2] ..... A47F 5/12
[58] Field of Search ..... 108/1-10; 248/372

[56] References Cited

UNITED STATES PATENTS

| | | | |
|---|---|---|---|
| 1,859,456 | 5/1932 | Nestler | 108/2 |
| 1,956,546 | 4/1934 | Froelich | 108/2 |
| 2,710,780 | 6/1955 | Lawes | 108/2 |
| 2,982,050 | 5/1961 | May | 108/2 |
| 3,089,275 | 5/1963 | Alabor | 108/2 |
| 3,213,809 | 10/1965 | Kritske | 108/2 |
| 3,359,927 | 12/1967 | Janus | 108/2 |

*Primary Examiner*—Roy D. Frazier
*Assistant Examiner*—William E. Lyddane
*Attorney, Agent, or Firm*—Holman & Stern

[57] ABSTRACT

A drawing table having a stand and a board linked to the stand in such a manner as to allow the board to be adjusted in position whereby the weight of the board creates a second moment about the axis opposing the first moment. A compensating means varies the second moment to compensate for variations in the first moment due to changes in the position of the board so that the board is balanced in any position.

10 Claims, 3 Drawing Figures

DRAWING TABLE

Matter enclosed in heavy brackets [ ] appears in the original patent but forms no part of this reissue specification; matter printed in italics indicates the additions made by reissue.

BACKGROUND OF THE INVENTION

The present invention relates to a drawing table comprising a stand and a drawing board which is secured by means of linkage means, pivotably journalled on the stand head, with the weight of the drawing board being counter-balanced in any position of the board.

PRIOR ART

Drawing tables are known, in which the weight balancing action is performed by springs or "gas" springs. With such drawing tables, the weight of the drawing board inclusive of accessories such as a drafting machine, receptacle, etc., is determined precisely, and the spring or springs are selected accordingly. It is observed in practice however that the characteristic curves of the springs or "gas" springs incur differences which do not allow uniform weight balancing. A difference may arise moreover in the weight of the drawing boards, of the drafting mechanism and/or other accessories, which may be counteracted only be means of springs having a different rating. The operation of hooking and unhooking the springs is very difficult and onerous and can be performed by a trained operative only. In addition, the springs incur fatigue in the course of time, the characteristic curve of a spring changes and weight balancing is thus inoperative. For this reason, the joints and brake of the drawing tables have been given a stiff action, so that a balance may be established by means of the additional friction.

OBJECT AND SUMMARY OF THE INVENTION

The present invention is intended to eliminate these shortcomings. It attempts to provide so precise a weight or counter balance, to provide an adaptation to change conditions of the drawing board effective weight, in such an uncomplicated way that the drawing table joints may be arranged to pivot freely.

According to the present invention, there is a drawing table comprising a stand, a board, linkage means pivotably connecting the board to an axis on the stand in a manner allowing the board to be adjusted in position and whereby the weight of the board creates a fist moment about said axis, counterbalancing means creating a second moment about said axis opposing the first moment and means for varying the second moment to compensate for variations in the first moment due to changes in position of the board so that the board is balanced in any position thereof.

Preferably, the means for varying the second moment comprises means for varying the point of application relative to said axis of a force creating the second moment.

Furthermore, the linkage means comprises a first arm pivotably attached to said axis on the stand and pivotably attached to the board, thereby linking the stand to the board; a second arm pivotably attached to said axis on the stand; and a link arm pivotably attached to the board and said second arm.

Also the counterbalancing means may be a helical spring attached at one end to the stand and at another end to a correct member rotatable about said axis upon movement of the board.

The point of action of the spring is adjustable or displaceable. Due to this displaceability, it is possible to take up tolerances in a simple manner and to allow so precise an adjustment that the bearing points of the parallelogram linkage means, in particular the bearing in the stand head, may be equipped with needle roller or ball bearings, so that the drawing table may be moved without effort in the unbraked state. This table may accordingly also be used by female drafting personnel while working in the seated position.

A complementary adjustment means is provided according to the present invention, by the fact that the free extremity of the balancing helical spring is hooked to an eyebolt which is adjustably arranged on the stand for varying the tension of the balancing spring. In conjunction with the possibility of displacing the point of action, which results in a change of the moment applied by means of the spring, adjustments may be made within wide limits, so that the inclusion of complementary accessories on the drawing board may also be considered without impairing the free displaceability of the drawing table in the unbraked state.

A preferred embodiment of the invention is characterized in that a pivot spindle to which the first or upper rocking arm is firmly connected, has fastened thereto a disc-shaped receiving element for a corrector disc rotatable around the axis of the pivot spindle, of which the outer rim extends spirally and has a receiving groove for a cable connected to the balance spring. The lever arm with which the balancing spring acts with respect to the pivot spindle axis is varied by turning the corrector disc with respect to the receiving element due to the spiral form of the corrector disc. The opposing moment engendered by the helical spring is varied thereby.

The corrector disc is concomitantly and preferably constructed as a partial disc and comprises a swivellably secured screwbolt carrying a thrust element adjustable by means of a nut, and held in a rotatable manner in a transversely directed recess of the receiving element. The displacement of the corrector disc with respect to the receiving element is thus performed by turning the nut on the screwbolt, a sticking or jamming action during the displacement being prevented by virtue of the rotatable arrangement of the thrust element in the recess of the receiving element.

To secure the cable fastened to the balancing spring in non-jamming manner and according to a further embodiment of the invention, the corrector disc has a recess arranged transversely to the receiving groove at the extremity of the latter on its extremity bearing the screwbolt, with a securing element for the cable of the balancing spring being held rotatably in said recess. The securing element concomitantly extends transversely to the disc and bears against a collet situated on the extremity of the cable.

Due to the spirally shaped form of the periphery of the corrector disc, which is coupled to the pivot spindle through the receiving element and is thus entrained in rotation in case of a pivotal displacement of the rocking arm during the displacement of the drawing board, the moment applied by the spring with respect to the pivot spindle axis undergoes an adaptation to the position of the drawing board changed with respect to the pivot spindle axis. A precise weight balancing action is thus assured in all positions of the board.

According to a further embodiment of the invention, the parallelogram link may be connected to an adjustable lever which is acted upon by at least one other spring which has its other extremity secured to a spring mounting which is displaceable in the vertical and horizontal direction. This spring equally serves the purpose of balancing, and the adjustment may be made either on the lever or the spring mounting. This adjustment serves the purpose of adaptation to the different tilted positions of the drawing board.

In further development of the invention, the weight balancing system is situated within the stand which is hollow. Accordingly, no linkage projects behind the stand, and a considerable saving of space is accomplished thereby.

To permit equilization between the different center of gravity positions resulting from the incorporation of a carriage drafting mechanism in place of a parallelogram drafting mechanism, and according to a further embodiment of the invention, the drawing board is arranged to be displaceable with respect to a securing or supporting bar acted upon by the pivoting linkage arms. In conjunction with the already defined balancing system, this arrangement renders it possible to employ carriage drafting mechanisms as well as parallelogram drafting mechanisms on the drawing table, without having to perform a replacement of the springs of the balancing system.

A particular embodiment will now be described, by way of example, with reference to the accompanying drawings in which:

DETAILED DESCRIPTION OF THE DRAWINGS

Figure 1:
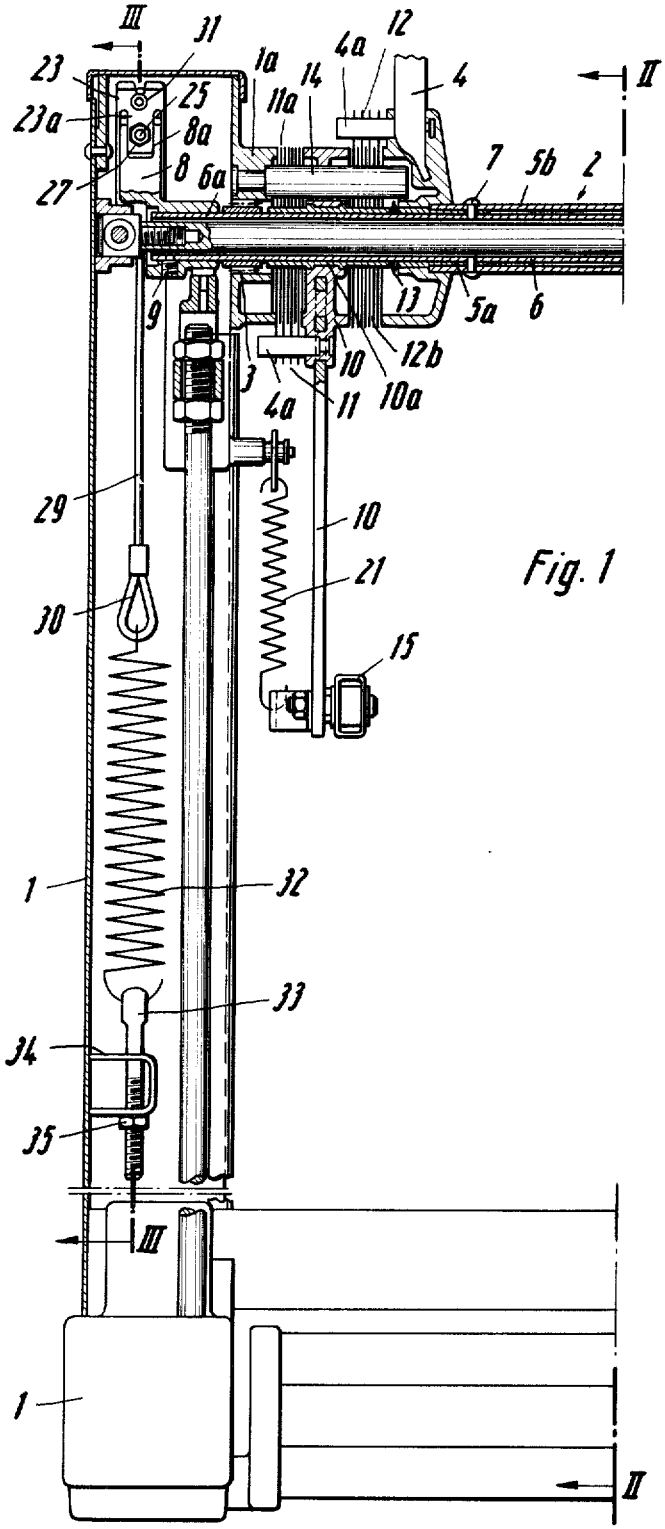
FIG. 1 is a partially sectioned front view of a drawing table without a board.
Figure 2:
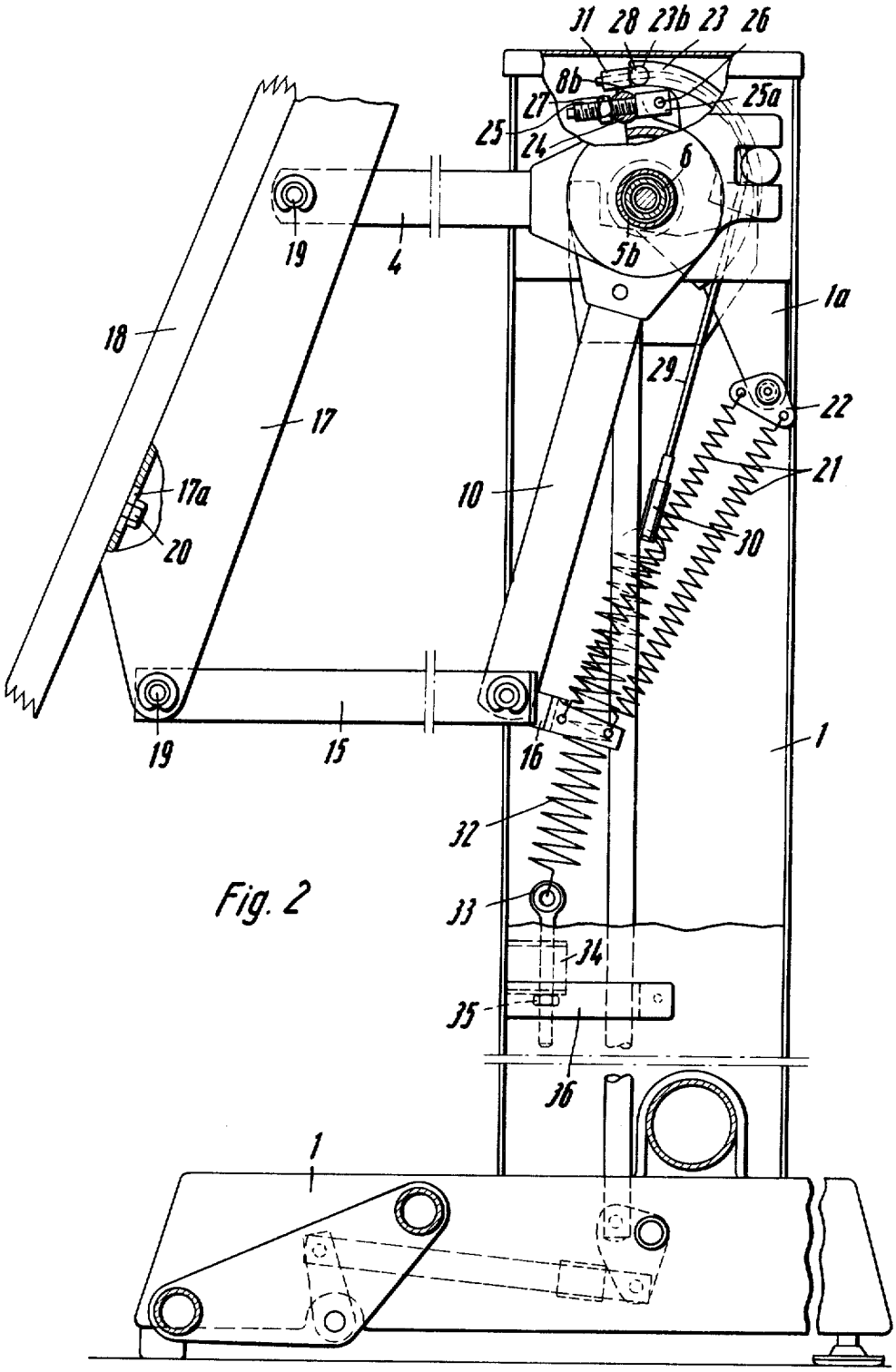
FIG. 2 is a section along the line II—II of FIG. 1, the view looking in the direction of the arrows.

A pivot spindle 2 constructed as a hollow spindle is arranged in freely rotatable manner by means of needle roller bearings 3 in the upper portion of a stand or pedestal 1 consisting of two pedestal feet. Upper pivot or rocking arms 4 are firmly coupled to the pivot spindle 2, for example by being cast integral therewith.

The pivot spindle 2 has a continuous tube 6, a partial tube 5a extending within a brake situated on the stand or pedestal head in each case, and a covering tube 5b situated between the brakes. The tubes 5a and 5b are firmly joined to the continuous tube 6 by means of a rivet 7.

Only the arrangement on the left-hand side pedestal column 1 is described in the following, since the right-hand side column is symmetrical and identical thereto. A receiving element 8 is fastened by means of a grub screw 9 to extremity 6a of the tube 6. Between the upper pivot arm 4 and the needle roller bearing 3 is situated another rocking arm 10 which is firmly joined to a bearing tube 10a by integral casting, with the bearing tube 10a being pivotably arranged within the braking system and rotatable on the tube 6. The arms 4 and 10 comprise entraining pins 4a for braking plates 11 and 12 of the braking system. Between the two rocking arms 4 and 10 are situated plate springs 13 which bear directly onto the tube 6 and have the purpose of separating the braking plates 11 and 12 from each other when the brake is released. Accordingly, the plate springs 13 bear against the partial tube 5a connected to the rocking arm 4 and against the bearing tube 10a connected to the rocking arm 10. A bolt 14 which secures intermediate braking plates 11a and 12b is firmly inserted into a pedestal head 1a.

A parallelogram link arm 15 is pivotably journalled on the rocking arm 10 and is joint-coupled to a securing bar 17. The bearing bolts employed for the articulation joints are marked 19. A drawing board 18 is fastened to the securing bar 17 on which the upper rocking arm 4 is jointedly secured by means of bearing bolts 19 and together with the rocking arm 10 and the parallelogram link arm 15 forms a movable parallelogram. Fastening is performed by means of screws 20 passing through longitudinal slots 17a of the securing bar 17 and thus allowing for the displacement of the drawing board 18 with respect to the securing bar. This displacement of the drawing board in the slots of the securing bar is required for adjustment of the weight balancing action by displacement of the center of gravity, which remains to be described in detail.

The parallelogram link 15 is connected to a lever 16 which is displaceable with respect to the arm 15. The lever 16 is acted upon by two springs 21 whose other extremities are hooked into a spring suspension system 22 which is held on the pedestal head 1a in vertically as well as horizontally displaceable manner. Together with another spring whose incorporation remains to be described the springs 21 serve the purpose of weight balancing.

The receiving element 8 has a groove 8a extending concentrically to the pivot axis of the pivot spindle 2 and receiving a corrector disc 23 which engages with an appropriate projection 23a in the groove 8a. The corrector disc 23 is constructed as a partial disc in the form of an annular sector and at it extremity which is that situated at the top in the assembled state, has a screwbolt 25 which is jointedly fastened on the corrector disc 23 by means of a fork element 25a and a bolt 26. The screwbolt 25 traverses a thrust element 24 which is borne in a recess 8b of the receiving element 8. A nut 27 which bears on the thrust element 24 is operated on the screwbolt 25 to adjust the corrector disc 23 with respect to the receiving element 8.

Figure 3:
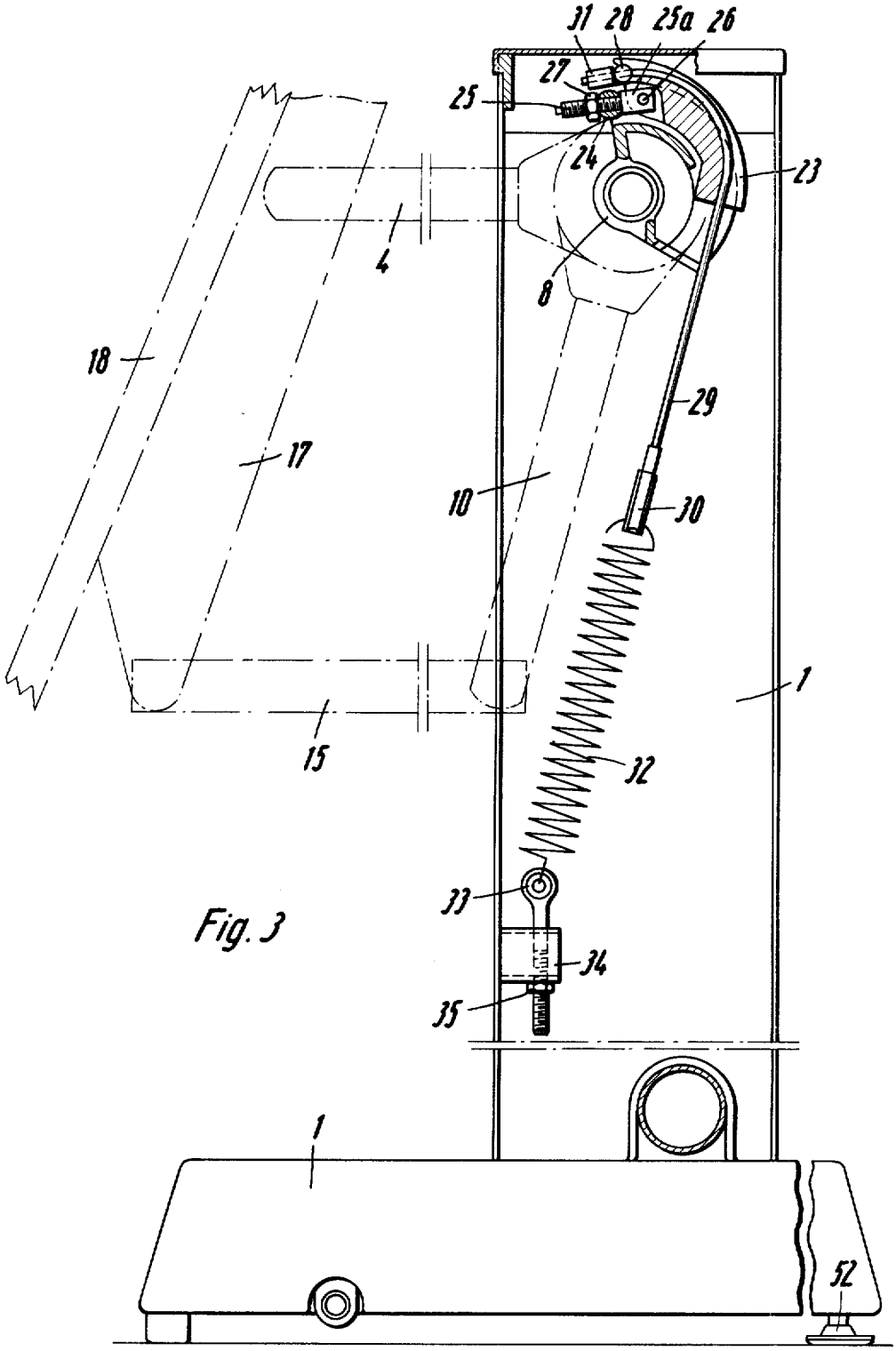
FIG. 3 is a section along the line III—III of FIG. 1, the view looking in the direction of the arrows.

As apparent from FIGS. 1 and 3, the corrector disc 23 is equipped with a reception groove 23a for a cable 29 which is connected to a tension spring 32. The cable 29 is immobilized on the upper extremity of the corrector disc by means of a cylindrical securing element 28, with the securing element 28 concomitantly being held rotatably in a corresponding recess 23b extending transversely to the receiving groove 23a. The securing element 28 then bears on a collet 31 joined firmly to the cable 29. A suspension loop in which is hooked the balance spring 32, is formed by means of a clamping sleeve 30 at the other extremity of the cable.

The other extremity of the balancing spring 32 is hooked into an eyebolt 33 which is inserted into a bracket 34 of the pedestal 1 and secured by means of a nut 35 employed to adjust the tension of the spring 36 marks a sealing flap giving access to the adjusting nut 35 within the hollow pedestal 1, wherein the balancing springs are housed.

The external edge of the corrector disc 23, meaning the bottom of the reception groove 23a, is spirally formed so that the point of action of the balancing spring 32 varies with respect to the pivot axis during rotation of the corrector disc with respect to the pivot axis.

The table weight balancing operation is performed by fine adjustment throughout the course of the displacement, by means of the corrector disc 23. The tension of the balancing spring 32 is varied by means of the nut 35, if additional equipment is installed in the system. The tilting movement applied through the parallelogram link 15 and the lever 16 is performed by displacement of the lever 16, or at the bracket 34. Since this displacement has a secondary importance in the balancing action, the springs 21 normally do not require adjustment. The optional incorporation of a carriage or parallelogram drafting mechanism on the drawing board may be taken into account by displacement of the drawing board 18 in the longitudinal slots 17a of the securing bar 17 and by varying the spring tension of the balancing spring 32, so that the compensation system may be employed for carriage as well as parallelogram drafting mechanisms, without conversion.

We claim:

1. A drawing table including a stand, a board, a horizontal spindle constituting an axis rotatably mounted in the stand, a first arm mounted on the spindle adjacent each end thereof, a second arm pivotally mounted on the spindle adjacent each end thereof, each of said first arms being pivotally attached to said board, a link arm pivotally attached to each of said second arms and to said board, a compensating member having a peripheral spiral groove rotatably mounted adjacent each end of said spindle, a cable having first and second ends, said cable being attached at the first end to the compensating member and located in the spiral groove, a counterbalancing means adjustably connected to the stand, and the second end of the cable being attached to the counterbalancing means, the attachment of the cable to the compensating member in the spiral groove enabling the point of action of the counterbalancing means to vary with respect to the pivot axis during rotation of the compensating member with respect to the pivot axis, the arrangement being such that the first and second arms and the link arms connecting the board to the horizontal spindle allow the board to be adjusted in position and in which the weight of the board creates a first moment about the axis and the counterbalancing means creates a second moment about the axis, with said compensating member varying the second moment to compensate for variations in the first moment due to changes in the position of the board whereby the board is balanced in any position thereof.

2. The drawing table as claimed in claim 1 in which the counterbalancing means is a helical spring.

3. The drawing table as claimed in claim 2 in which the adjustable connection of the counterbalancing means to the stand includes an eyebolt to which the helical spring is attached, a bracket on the stand receiving the eyebolt, and an adjustment nut for the eyebolt for adjusting the position of the eyebolt on the bracket for varying the tension of the helical spring.

4. The drawing table of claim 1 further comprising a receiving disc fixed to said first arm and rotatable about said axis, the receiving disc being linked to the compensating member having a peripheral spiral groove for varying said point of application.

5. The drawing table of claim 4 wherein the compensating member is a partial disc sector.

6. The drawing table of claim 5 wherein the compensating member has a pivotably secured screwbolt carrying a thrust element which is adjustable by means of a nut on the screwbolt and rotatably secured in a transversely directed recess of the receiving disc.

7. The drawing table of claim 6 wherein the compensating member has a recess situated in the sides of the spiral helical groove of the corrector member and extending transversely to the spiral helical groove adjacent the screwbolt, a securing element for the cable of the helical spring being rotatably secured in said recess.

8. The drawing table of claim 7 wherein the link arm is connected to an adjustable lever acted upon by a second spring which is secured on a spring mounting of the stand, the spring mounting being adjustable in vertical and horizontal directions.

9. The drawing table of claim 8 wherein the helical spring, cable, and compensating member are housed within the stand.

10. The drawing table of claim 9 wherein the drawing board is displaceably arranged on a securing bar which is pivotably fixed to said first arm and said link arm.

* * * * *